United States Patent [19]

McRae et al.

[11] Patent Number: 4,872,182
[45] Date of Patent: Oct. 3, 1989

[54] FREQUENCY MANAGEMENT SYSTEM FOR USE IN MULTISTATION H.F. COMMUNICATION NETWORK

[75] Inventors: Daniel D. McRae, West Melbourne; William N. Furman, Melbourne, both of Fla.

[73] Assignee: Harris Corporation, Melbourne, Fla.

[21] Appl. No.: 165,580

[22] Filed: Mar. 8, 1988

[51] Int. Cl.⁴ .............................................. H04K 1/00
[52] U.S. Cl. .......................................... 375/1; 380/34
[58] Field of Search ............................. 375/1; 380/34

[56] References Cited

U.S. PATENT DOCUMENTS

| | | | |
|---|---|---|---|
| 4,193,030 | 3/1980 | Rabow et al. | 375/1 |
| 4,271,524 | 6/1981 | Goodman et al. | 375/1 |
| 4,320,514 | 3/1982 | Haskell | 375/1 |
| 4,355,399 | 10/1982 | Timor | 375/1 |
| 4,392,231 | 7/1983 | Henry | 375/1 |
| 4,425,661 | 1/1984 | Moses et al. | 375/1 |
| 4,563,774 | 1/1986 | Gloge | 375/1 |
| 4,641,322 | 2/1987 | Hasegawa | 375/1 |

Primary Examiner—Salvatore Cangialosi
Attorney, Agent, or Firm—Antonelli, Terry & Wands

[57] ABSTRACT

A frequency management scheme for a multistation H.F. communication network establishes communication channels among network stations over respective ones of K frequencies, so that network stations may communicate with one another. Any station desiring to communicate with another station, repeatedly transmits, on each of plural ones of the K communication frequencies in sequence, a probe message comprised of three successive symbols, each of which is defined in accordance with a prescribed pseudo random M-ary code, in the form of multi-chip sequence, that represents the address of the station to whom the communication is directed. The first symbol is effectively unmodulated to permit monitoring equipment of a receiving station of the network to settle out. The second symbol represents the address of the transmitting station. The third symbol identifies the number of times that the frequency which carries the probe message has been transmitted. Each idle station monitors the level of activity of each of the K communication frequencies by successively dwelling on each frequency for the length of time required for any message-transmitting station to step through all K frequencies of the network. During each dwell time, the idle station looks for its address. If a probe message is directed to that monitoring station, the addressed station transmits back to the probing station a prescribed three symbol response message.

38 Claims, 3 Drawing Sheets

FREQUENCY MANAGEMENT SYSTEM FOR USE IN MULTISTATION H.F. COMMUNICATION NETWORK

FIELD OF THE INVENTION

The present invention relates in general to communication systems and is particularly directed to a frequency management scheme for controlling the assignment of communication channels among member stations of a multistation high frequency communication network.

BACKGROUND OF THE INVENTION

High frequency communication systems, which employ ionospheric channels for point-to-point communications, are subject to a number of transmission quality degradation characteristics, such as multipath propagation and Doppler spread, and often suffer from fading or temporary loss of signal. To accommodate for these effects and hopefully maximize the probability of conducting a successful transmission between two stations, particularly in the case of multistation, or multinode, networks, a plurality or pool of frequencies is made available to the member stations of the network and communications are established by assigning to a pair of stations who wish to communicate with one another a frequency that has been determined to possess some defined probability of throughput success. Often this task has been accomplished by a trial and error process of manually tuning a station transceiver to the different frequencies of the pool until a frequency that 'get's through' is found. Even in those cases where station equipment contains a scanning receiver, the step and wait process carried out by the transmitting site and the types of waveforms used to confirm signal acquisition have made for such a slow process that communication channel set-up times on the order of ten to twelve minutes are not uncommon In addition, because the frequency management process employs signal protocols that require very high signal-to-noise ratios (typically on the order of 10-20 dB), channels that would otherwise be available for use by the network may be buried (and therefore unlocatable) in the presence of noise (which is non-Gaussian in an H.F. channel).

For an illustration of examples of literature describing a variety of conventional frequency management schemes, attention may be directed to the following: U.S. Pat. Nos. 3443228, 3887798, 4023103, 4066964, 4140973, 4146839, 4155040, 4193030, 4197500, 4271524, 4291409, 4309773, 4320514, 4328581, 4355399, 4365338, 4388726, 4555806 and 4616364, European Patent No. 182762 and Soviet Union Patent Nos. 562928, 612415 and 1053302 and an article by J. J. Merkel et al entitled "Microcomputer Application to a Spread Spectrum Frequency Hopping Modem", National Telecommunications Conference, San Diego, CA. 1974, PP. 536-542.

SUMMARY OF THE INVENTION

In accordance with the present invention the above mentioned drawbacks of conventional frequency management mechanisms, particularly those used for H.F.communication networks, are obviated by a new and improved channel assignment scheme that is capable of operating with negative signal-to-noise ratios and can assign a communication channel between member stations of a multistation network within a time frame (typically well under twenty seconds) that is reduced considerably in comparison with conventional frequency management systems. For this purpose the present invention is designed to be employed in a multistation H.F. communication network containing a plurality of N stations each of which is capable of communicating with any other station of the network over any one of a plurality of K communication frequencies. The establishment of communication channels over respective ones of the K frequencies, so that stations of said network may communicate with one another, is effected by the following procedure.

Any station desiring to communicate with another station of the network, repeatedly transmits, on each of plural ones of the K communication frequencies in sequence, a probe message comprised of three successive symbols, each of which is defined in accordance with a prescribed pseudo random M-ary code, in the form of a multi-chip sequence, that represents the address of the station to whom the communication is directed. During the first symbol time, the transmitting station transmits a base multi-chip sequence (e.g. a 32 chip sequence, each chip of which corresponds to one of the phases of an M-ary PSK signal) that contains no information (is effectively unmodulated) and is used essentially as a buffer symbol to permit the monitoring equipment of a receiving station of the network to settle out. During the next successive (second) symbol time the transmitting station transmits a (Walsh function)-modulated version of the base multi-chip sequence, with the modulation of the base sequence being representative of the address of the transmitting station. During the third symbol time, the transmitting station transmits a further (Walsh function)-modulated version of the base multi-chip sequence representative of the number of times that the frequency which carries the probe message has been transmitted.

Each station that is in an idle mode monitors the level of activity (including channel quality) of each of the K communication frequencies by successively dwelling on each frequency for the length of time required for any message-transmitting station to step through all K frequencies of the network. During each dwell time, the idle station looks for a probe message addressed to it by comparing a stored multi-chip sequence that represents its own address with the base sequence contained within the probe message. If a probe message is directed to that monitoring station, then, during the second symbol time, the addressed station will examine the modulation contents of the (second) symbol to determine which of the other station of the network is sending the probe message. In addition, the addressed station changes (reduces) its dwell time to follow, in tandem, the scan rate of the transmitting station and thereby monitors each of the frequencies being repeatedly transmitted by the probing station. The addressed station also examines the modulation contents of the third symbol, in order to determine the number of times that the probe message has been repeated, so that it may know when the probe message will terminate and may commense the transmission of a reply message.

When the probing station has completed its repeated transmissions of the probe message over all K frequencies a K number of times, the addressed station transmits back to the probing station a three symbol response message. As in the case of the probe message, each symbol is based upon a prescribed multi-chip pseudo random sequence associated with the address of the station to whom the message is being transmitted. Again, the first symbol is unmodulated, in order to permit the receiver equipment at the probe station to settle. During the second symbol time of the response message, the base multi-chip sequence is (Walsh function)-modulated with information representative of which of the frequencies that have been monitored by the previously idle station is the preferred (highest transmission quality) one of the K communication frequencies to be used as the channel over which the probing station and the idle station are to communicate with one another. During the third symbol time, the base sequence of the response message is modulated with information representative of a measure of the signal quality of the selected one of the K communication frequencies that has been indicated in the second symbol of the response message to be the preferred frequency of the communication channel between the two stations.

DETAILED DESCRIPTION

Figure 1:
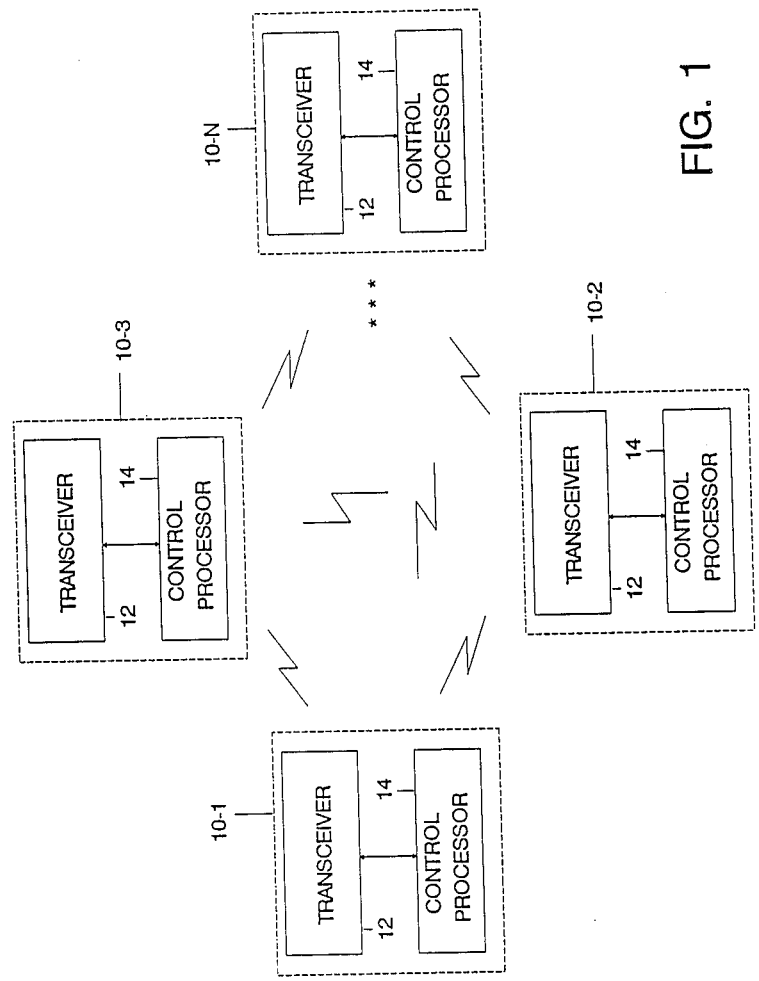
FIG. 1 is a diagrammatical illustration of a multistation or multinode H.F. communication network comprising a plurality of N (e.g. sixteen) geographically dispersed nodes.

Before describing in detail the particular improved multistation frequency management system in accordance with the present invention, it should be observed that the present invention resides primarily in a novel control mechanism for a communication network which employs conventional communication circuits and components. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

With reference initially to FIG. 1, there is shown a multistation or multinode H.F. communication network comprising a plurality of N (e.g. sixteen) geographically dispersed nodes or stations 10-1, . . . , 10-N each of which contains a frequency agile transceiver 12 controlled by an associated microprocessor 14. For this purpose transceiver 12 may comprise an RF 590H-RF 13H unit manufactured by Harris Corp. (RF Com. Division), while processor 14 may comprise a TMS-32010 processor manufactured by Texas Instruments. As the details of such communication equipment is unnecessary for an understanding of the present invention, they will not be presented here. Rather, the description to follow will focus on the control mechanism that governs the transmission, reception and signal processing operations carried out by such equipment that enables any station to gain access to the best available communication channel for exchanging messages with another station in the network in the shortest possible time (typically on the order of twelve seconds).

Figure 2:
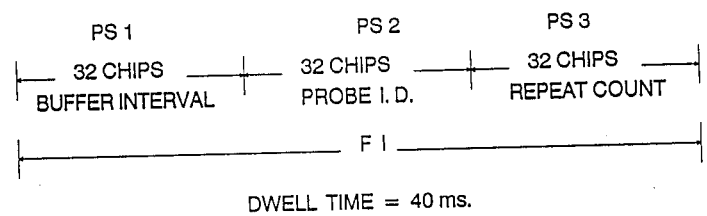
FIG. 2 shows the signal format of a probe message used by a station desiring to communicate with another station of the network.

Referring now to FIG. 2, the signal format of a probe message used by a station desiring to communicate with another station of the network is shown as comprising three successive probe symbols PS1, PS2 and PS3, each of which takes the form of a multichip pseudo noise sequence comprised of M-ary PSK modulation of a prescribed H.F. frequency. For purposes of the present description it will be assumed that a nominal H.F. channel has a bandwidth on the order of 3KHz. and that each multichip sequence of which a symbol is formed contains 32 chips, each chip being one of M=8 phases, with a modulation rate of 2400 chips/sec. In addition, each multichip sequence is defined so as to be effectively orthogonal to every other multichip sequence used by the stations of the network.

Within the probe message itself the first symbol PS1 of the transmitted sequence represents the identity or address of the station for whom the probe message is intended and, as pointed out above, is transmitted unmodulated, so that the first symbol is merely used to enable the receiver equipment to settle after changing frequencies. Pursuant to the invention, for a K station network there are K+1 unique and effectively orthogonal base multi-chip sequences that are used by the network. K ones of the plural sequences represent the identities or addresses of the respective stations of the network. The (K+1)th sequence is used by all stations of the network for data transmission.

Unlike the first symbol PS1, the second symbol PS2 is modulated with information representative of the address of the probe message transmitting station For this purpose, the base multi-chip sequence that defines the address of the station for whom the message is intended is modulated, using a modulation format that produces correlation orthogonality among different encoding sequences (e.g. a conventional Walsh function modulation format) with information representative of the address of the probe message-transmitting station. Similarly, the third symbol PS3 is (Walsh function)-modulated with information that represents the number of times that the particular frequency on which the probe message is currently being transmitted has been repeated on that frequency As will be explained below this third symbol is effectively a count value that tells the destination station when the probe message will terminate, so that the destination station will know when to transmit a response message back to the probe station.

Figure 3:
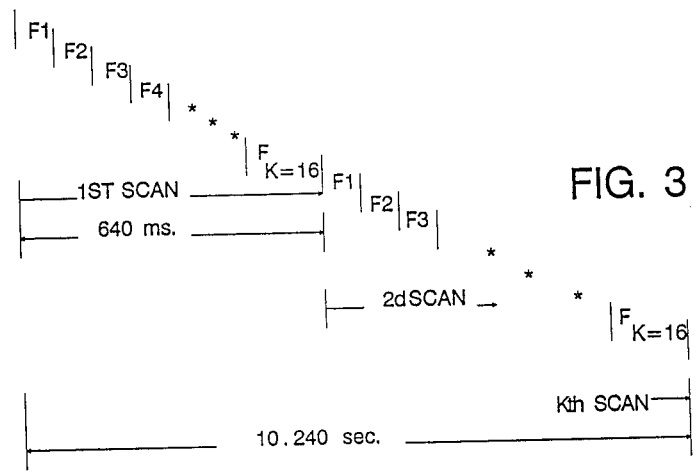
FIG. 3 diagrammatically illustrates the manner in which a probe station repeatedly scans through (successively transmits) each of the frequencies of the pool of frequencies that are available to the network frequency.

FIG. 3 diagrammatically illustrates the manner in which the probe station repeatedly scans through (successively transmits) each of the frequencies of the pool of frequencies that are available to the network, each frequency containing the three symbol probe message described above. For purposes of the present example it will be assumed that during each scan through the K frequencies of the network pool each frequency is transmitted for a period of 40 ms., so that for a total of $K=N=16$ frequencies of the present example the probe station steps through all 16 frequencies in 640 ms. Consequently, a total of sixteen repeats through all sixteen frequencies requires 10.240 seconds. As will be explained below the repeated scanning through all $K=16$ frequencies must be carried out $K=16$ times to ensure that the (idle) destination station for whom the probe message is intended will capture the probe message.

Figure 4:
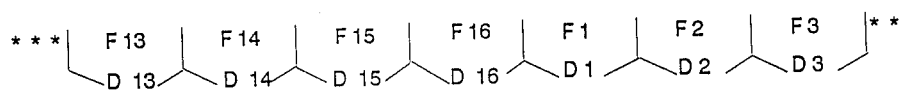
FIG. 4 diagrammatically illustrates the manner in which an idle station successively monitors each of the available frequencies of the network for the presence of a probe message that may be transmitted to that idle station.

More particularly, FIG. 4 diagrammatically illustrates the manner in which an idle station successively monitors each of the available frequencies of the network for the presence of a probe message that may be transmitted to that idle station. During the idle mode, each station successively tunes its receiver to each of the $K=16$ frequencies F1-FK and monitors each frequency for a prescribed dwell time. The dwell time on a respective frequency of an idle station's receiver is equal to the total length of time required for a probe station to scan through each of the frequencies of the multistation pool. Using the parameters of the present example, the dwell time on a respective one of the $K=16$ frequencies is equal to $16 \times 40$ ms. or 640 ms. During each dwell interval any modulation present on the frequency being monitored is processed by the receiver's attendant signal processor, not only for the purpose of detecting a probe message directed to that idle station, but to gain a measure of traffic and signal quality of each frequency of the network pool.

For this purpose each idle station keeps a set of four tables of information for each of the frequencies of the pool, the contents of respective ones of which represent whether a probe message is being transmitted to that idle station, whether a particular frequency is unused, whether that frequency is being used by the network and whether that frequency is being used by someone outside the network. In addition, for each frequency in each table, information is stored representative of signal quality characteristics of the monitored frequency, so as to enable the idle station to select the 'best' available frequency of the pool for establishing a communication channel with the probe station. It is to be noted that the initiation of a probe message and the sequential monitoring of the frequencies of the network pool by the member idle stations occur relatively asynchronously. Consequently, the dwell time for each frequency by an idle station corresponds to the period of a single sweep through the frequencies of the network by a probe station, with the number of repeats by the probe station being equal to the total number of frequencies, so as to effectively ensure that there will be at least one frequency to which the receiver of the idle station for whom the probe message is intended will be tuned, and thereby enable the idle station to detect the probe message.

As described above, a probe message comprises a sequence of three probe symbols PS1, PS2 and PS3 each containing a number of M-ary PSK chips (32 eight-phase chips in the present example). Within the receiver equipment of each station the contents of a monitored frequency are processed by sampling and digitizing the signal contents and applying the data samples to the station's signal processor. Because each symbol is comprised of a pseudo noise code that is effectively orthogonal to every other symbol employed by the network, signal processing can be rapidly effected through correlation of the sampled data with copies of each of the 32 chip codes employed within the network. Detecting that a monitored frequency contains a probe message intended for that idle station, for example, is effected by correlating the contents of the monitored frequency with a stored 32 chip code that uniquely defines that idle station's address. If the idle station does not detect its address it continues stepping through each frequency in the manner shown in FIG. 4.

It should be observed that simply because a monitored frequency contains no probe message intended for that idle station does not mean that the monitored frequency is quiet or unused. One or more frequencies of the network pool may be used for the transmission of data traffic between other stations of the network. As poined out above, all data traffic is preferably modulated using a dedicated pseudo noise code, uncorrelated with the respective codes that are used to define the addresses of the member stations of the network. As a result, an idle station is able to monitor the use of (listen in on) each of the network frequencies by correlating modulations on each frequency with this data transmission code (in addition to the correlation with it's station address code). In the course of this action the idle station will note the monitored frequency as occupied by the network and is able to obtain a measure of signal quality for that frequency.

It is also possible that a network frequency may be used by transmitter outside the network. In this event the correlation signal processing associated with the 32 chip pseudo noise codes employed by the network will produce no strong energy profile, so as to inform the monitoring station of no network activity of a nonmember station on that frequency.

Figure 5:
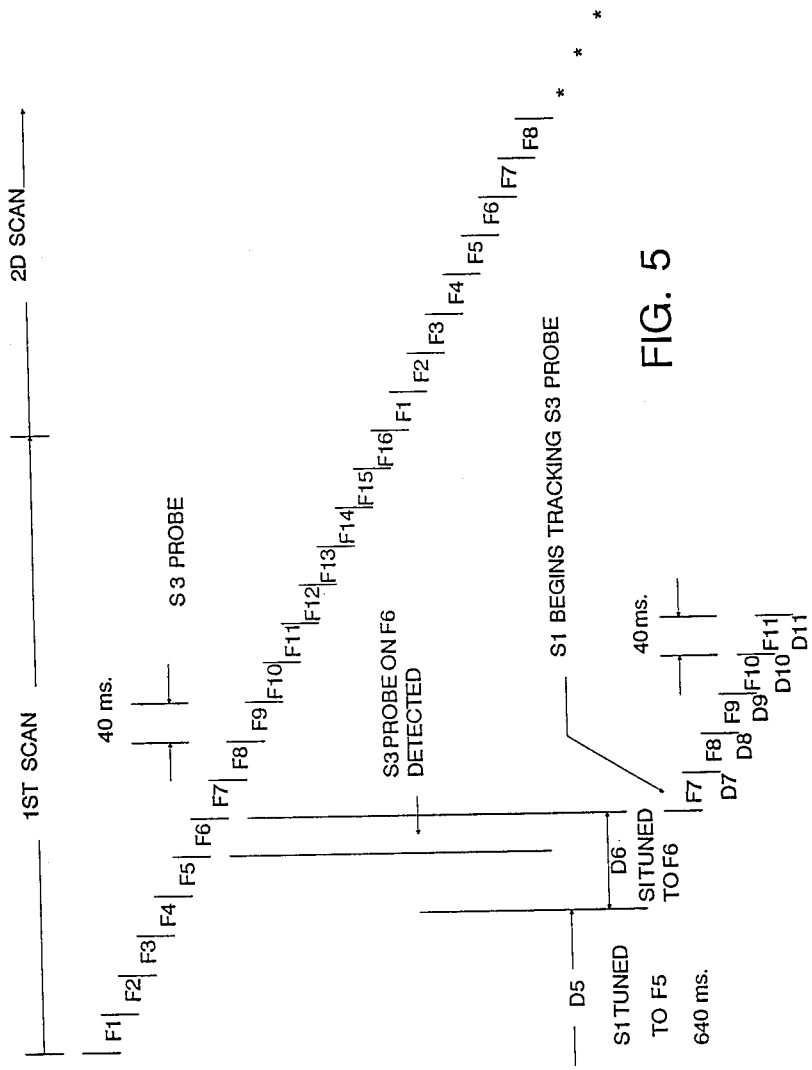
FIG. 5 diagrammatically shows an example of the relationship between the repeated frequency scanning action of a probe station and an idle station for whom the probe message is intended.

FIG. 5 diagrammatically shows an example of the relationship between the repeated frequency scanning action of a probe station (for example station S3) and an idle station (for example, station S1) for whom the probe message is intended. As pointed out above, the frequency scanning carried out by each station of the network is asynchronous with respect to the operation of the other stations. In the frequency scanning sequences depicted in FIG. 5 it can be seen that the probe station (station S3) begins stepping through frequencies F1-FK (at 40 ms. intervals) during the (640 ms.) dwell interval D5 that idle station (station S1) is dwelling on frequency F5. If frequency F5 is available and propagating, then station S1 should detect the probe message during this dwell time. If not, then station S1 will have the opportunity to detect the probe message during successive (640 ms.) dwell intervals D6-D16 associated with frequencies F6-F16. In the present example it will be assumed that station S1 detects the probe message from station S3 during dwell interval D6.

Upon detecting its address during the second symbol portion of the three symbol probe message during dwell interval D6, station S1 changes its frequency dwell time from 640 ms. to 40 ms. so that it may follow, in tandem, the frequency scanning action of probe station S3. During each of these reduced dwell intervals station S1 monitors its own address code to verify that the probe message from station S3 is indeed intended for station S1 and enables station S1 to carry out a quality measurement on each frequency, as it correlates its address code with the multi-chip sequence upon which the symbol contents of the probe message of the monitored frequency are based. In addition to conducting a quality measurement, station S1 tracks the contents of the third symbol (frequency repeat count), so that it will know when probe station S3 has concluded transmitting the probe message.

Figure 6:
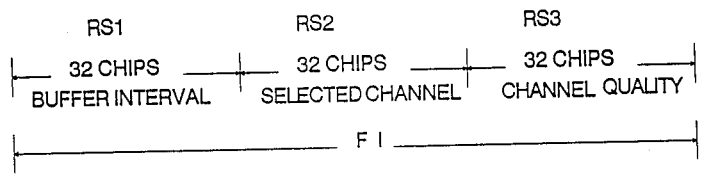
FIG. 6 illustrates the format of a response message from an idle station to a probe station.

Upon the termination of the probe message from station S3, station S1 transmits back to station S3 a three symbol response message formatted as diagrammatically illustrated in FIG. 6. As shown therein the response message is comprised of three response symbols RS1-RS3, each of which is defined in accordance with a base multi-chip (32 chip) M(=8)-ary PSK pseudo noise sequence associated with the address of the probe station for whom the response message is intended. As in the case of the probe message, the first response symbol RS1 is unmodulated and is simply used as a stabilization interval during which the receiver at the probe station settles down after a frequency change. The second response symbol RS2 is a (Walsh function) modulation of the base response sequence that represents which one of the K=16 frequencies of the network pool that has been determined from the signal quality table generated in station S1's signal processor to be the 'best' available frequency for conducting communications between the two stations (S1 and S3). The third response symbol RS3 is a further (Walsh function) modulation of the base response sequence representing a measure of the signal quality associated with the selected frequency and is preferably tailored to the type of equipment contained within the stations. For example, the contents of the third response symbol may take into account the capability of the station's modem equipment to accommodate wider multipath spreads.

The response message is transmitted by the previously idle station S1 on each available frequency in sequence, at 40 ms. dwell intervals and then the sequence is repeated once to ensure detection by the original probe station. For a sixteen frequency pool of the present example, a double sweep through each of the frequencies at a 40 ms. dwell per frequency means that the time required to transmit a response message is 1.28 seconds, yielding a total set-up time of only 11.52 seconds, which is considerably less than the multi-minute set-up time of conventional frequency management schemes, referenced previously. Each of stations S1 and S3 then proceeds to tune its receiver to the frequency assigned by the second response symbol RS2 of the response message from station S3 to station S1, so that data traffic between the two stations may be exchanged.

As pointed out previously, all data traffic between stations of the network is conducted using a prescribed data symbol (dedicated (K+1)th 32 chip M-ary PSK code), so as to enable (idle) stations to monitor the use of each of the frequencies of the network. In this regard, from the activity or use table that is maintained by each station of the network (during its idle mode), any station which proceeds to transmit a message by stepping through the K frequencies of the network, such as a probe station going form an idle mode to a probe mode, knows which frequencies are already occupied by other users of the network for data traffic and, accordingly, should not be used for other message transmissions. As a consequence, these frequencies are designated as unavailable and are blanked during their respective 40 ms. dwell intervals. In the present example, therefore, during the transmission of a probe message by station S3, any frequency which has been 'tagged' as unavailable in its idle mode-generated activity table will be blanked during each of the 40 ms. intervals of the sixteen repetition frequency sweep associated with that frequency.

As will be appreciated from the foregoing description, the present invention provides a frequency management scheme for use with a H.F. communication network that enables any two stations of the network to be automatically and rapidly assigned a communication channel from among the pool of frequencies that are available to the member stations. In accordance with the present invention the drawbacks of conventional frequency management mechanisms, particularly those used for H.F. communication networks, are eliminated by a channel assignment scheme that is capable of operating with negative signal-to-noise ratios and assigning a communication channel between member stations of a multistation network within a time frame (on the order of under twelve seconds) that is reduced considerably in comparison with conventional management systems.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use in a multistation communication network containing a plurality of N stations each of which is capable of communicating with any other station of the network over any one of a plurality of K communication frequencies, a method of establishing a communication channel over one of said frequencies between a first station desiring to communicate with a second station of said network comprising the steps of:
   at said first station,
   (a) transmitting, on plural ones of said K communication frequencies in sequence, a probe waveform containing a first pseudo random code representative of the identity of said second station and a second pseudo random code representative of the identity of said first station; and
   at said second station,
   (b) sequentially monitoring each of said K communication frequencies for a transmission containing said first pseudo random code; and
   (c) in response to detecting, in step (b), a transmission containing said first pseudo random code, transmitting, on plural ones of said K communication frequencies in sequence, a response waveform containing said second pseudo random code and a third pseudo random code representative of a prescribed one of said K communication frequencies to be used as the channel over which said first and second stations are to communicate with one another.

2. A method according to claim 1, wherein said pseudo random codes are effectively orthogonal with respect to one another.

3. A method according to claim 1, wherein each of said pseudo random codes is comprised of a pseudo random sequence of M-ary phase shift keyed signals.

4. A method according to claim 1, wherein step (b) includes measuring signal quality characteristics of monitored frequencies, and step (c) includes transmitting, as part of said response waveform, a fourth pseudo random code representative of the signal quality characteristic of said prescribed one of said K communication frequencies to be used as the channel over which said first and second stations are to communicate with one another.

5. A method according to claim 1, wherein step (a) comprises stepping through each of said K frequencies at a first stepping rate K number of times, and step (b) comprises stepping through each of said K frequencies at a second stepping rate slower than said first stepping rate.

6. A method according to claim 5, wherein said second stepping rate corresponds to 1/Kth of said first stepping rate.

7. A method according to claim 1, wherein step (a) comprises stepping through each of said K frequencies at a first stepping rate N number of times, and step (b) comprises stepping through each of said K frequencies at a second stepping rate, slower than said first stepping rate, until said first pseudo random code is detected in step (b), and thereafter stepping through said K frequencies at said first stepping rate in tandem with step (a).

8. A method according to claim 7, wherein said probe waveform further includes a fourth pseudo random code representative of the number of times that step (a) has stepped through the frequency on which the probe waveform is currently being transmitted.

9. A method according to claim 8, wherein step (b) includes measuring signal quality characteristics of monitored frequencies, and step (c) includes transmitting, as part of said response waveform, a fifth pseudo random code representative of the signal quality characteristic of said prescribed one of said K communication frequencies to be used as the channel over which said first and second stations are to communicate with one another.

10. A method according to claim 9, wherein said pseudo random codes are effectively orthogonal with respect to one another.

11. A method according to claim 10, wherein each of said pseudo random codes is comprised of a pseudo random sequence of M-ary phase shift keyed signals.

12. A method according to claim 7, wherein said second stepping rate corresponds to 1/Kth of said first stepping rate.

13. A method according to claim 1, further including the step of
at each of said first and second stations,
(d) transmitting data over said channel by modulating said prescribed one of said K frequencies with a fourth pseudo random code.

14. For use in a multistation communication network containing a plurality of N stations each of which is capable of communicating with any other station of the network over any one of a plurality of K communication frequencies, a method of managing the establishment of communication channels over respective ones of said frequencies so that stations of said network may communicate with one another comprising the steps of:
at any station desiring to communicate with another station of said network,
(a) transmitting, on plural ones of said K communication frequencies in sequence, a probe message containing a first symbol representative of the identity of said any station and a second symbol representative of the identity of said another station; and at each station that is in an idle mode,
(b) sequentially monitoring each of said K communication frequencies for a probe message containing a second symbol representative of the identity of that station; and
(c) in response to detecting, in step (b), a probe message containing a second symbol representative of the identity of that station, transmitting, on plural ones of said K communication frequencies in sequence, a response message containing said first symbol and a third symbol representative of which of said K communication frequencies is to be used as the channel over which the station whose identity is represented by said first symbol and the station whose identity is represented by said second symbol are to communicate with one another, and wherein
each of said symbols is in the form of a respective pseudo random code.

15. A method according to claim 14, wherein said pseudo random codes are effectively orthogonal with respect to one another.

16. A method according to claim 14, wherein each of said pseudo random codes is comprised of a pseudo random sequence of M-ary phase shift keyed signals.

17. A method according to claim 14, wherein step (b) includes measuring signal quality characteristics of monitored frequencies, and step (c) includes transmitting, as part of said response message a fourth symbol representative of the signal quality characteristic of said prescribed one of said K communication frequencies to be used as the channel over which the station whose identity is represented by said first symbol and the station whose identity is represented by said second symbol are to communicate with one another.

18. A method according to claim 14, wherein N=K and step (a) comprises stepping through each of said K frequencies at a first stepping rate N number of times, and step (b) comprises stepping through each of said K frequencies at a second stepping rate slower than said first stepping rate.

19. A method according to claim 18, wherein said second stepping rate corresponds to 1/Nth of said first stepping rate.

20. A method according to claim 14, wherein N=K and step (a) comprises stepping through each of said K frequencies at a first stepping rate N number of times, and step (b) comprises stepping through each of said K frequencies at a second stepping rate, slower than said first stepping rate, until said second symbol is detected in step (c), and thereafter stepping through said K frequencies at said first stepping rate in tandem with step (a).

21. A method according to claim 20, wherein said probe message further includes a fourth symbol representative of the number of times that step (a) has stepped through the frequency on which the probe message is currently being transmitted.

22. A method according to claim 21, wherein step (b) includes measuring signal quality characteristics of monitored frequencies, and step (c) includes transmitting, as part of said response waveform, a fifth symbol representative of the signal quality characteristic of said prescribed one of said K communication frequencies to be used as the channel over which said first and second stations are to communicate with one another.

23. A method according to claim 22, wherein said pseudo random codes are effectively orthogonal with respect to one another.

24. A method according to claim 23, wherein each of said pseudo random codes is comprised of a pseudo random sequence of M-ary phase shift keyed signals.

25. A method according to claim 14, further including the step of
at each of said any and another second stations,
(d) transmitting data over said channel by modulating said prescribed one of said K frequencies with a pseudo random code exclusive of pseudo random codes of which said symbols are formed.

26. For use in a multistation communication network containing a plurality of N stations each of which is capable of communicating with any other station of the network over any one of a plurality of K communication frequencies, a system for establishing a communication channel over one of said frequencies between a first station desiring to communicate with a second station of said network comprising:
at said first station,
first means for transmitting, on plural ones of said K communication frequencies in sequence, a probe waveform containing a first pseudo random code representative of the identity of said second station and a second pseudo random code representative of the identity of said first station; and
at said second station,
second means for sequentially monitoring each of said K communication frequencies for a transmission from said first station containing said first pseudo random code; and
third means, coupled to said second means and responsive to said second means detecting a transmission from said first station containing said first pseudo random code, for transmitting, on plural ones of said K communication frequencies in sequence, a response waveform containing said second pseudo random code and a third pseudo random code representative of a prescribed one of said K commuhication frequencies to be used as the channel over which said first and second stations are to communicate with one another.

27. A system according to claim 26, wherein said pseudo random codes are effectively orthogonal with respect to one another.

28. A system according to claim 26, wherein each of said pseudo random codes is comprised of a pseudo random sequence of M-ary phase shift keyed signals.

29. A system according to claim 26, wherein said second means includes means for measuring signal quality characteristics of monitored frequencies, and said third means includes means for transmitting, as part of said response waveform, a fourth pseudo random code representative of the signal quality characteristic of said prescribed one of said K communication frequencies to be used as the channel over which said first and second stations are to communicate with one another.

30. A system according to claim 26, wherein said first means comprises means for stepping through each of said K frequencies at a first stepping rate K number of times, and said second means comprises means for stepping through each of said K frequencies at a second stepping rate slower than said first stepping rate.

31. A system according to claim 30, wherein said second stepping rate corresponds to 1/Kth of said first stepping rate.

32. A system according to claim 26, wherein said first means comprises means for stepping through each of said K frequencies at a first stepping rate N number of times, and said second means comprises means for stepping through each of said K frequencies at a second stepping rate, slower than said first stepping rate, until said first pseudo random code is detected by said second means, and thereafter stepping through said K frequencies at said first stepping rate in tandem with said first means.

33. A system according to claim 32, wherein said probe waveform further includes a fourth pseudo random code representative of the number of times that said first means has stepped through the frequency on which the probe waveform is currently being transmitted.

34. A system according to claim 33, wherein said second means includes means for measuring signal quality characteristics of monitored frequencies, and said third means includes means for transmitting, as part of said response waveform, a fifth pseudo random code representative of the signal quality characteristic of said prescribed one of said K communication frequencies to be used as the channel over which said first and second stations are to communicate with one another.

35. A system according to claim 34, wherein said pseudo random codes are effectively orthogonal with respect to one another.

36. A system according to claim 35, wherein each of said pseudo random codes is comprised of a pseudo random sequence of M-ary phase shift keyed signals.

37. A system according to claim 32, wherein said second stepping rate corresponds to 1/Kth of said first stepping rate.

38. A system according to claim 26, wherein said second pseudo random code is defined by a modulation of said first pseudo random code.

* * * * *